US010367377B2

(12) United States Patent
Yuasa

(10) Patent No.: US 10,367,377 B2
(45) Date of Patent: Jul. 30, 2019

(54) VEHICLE AND CONTACTLESS POWER TRANSFER SYSTEM

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 15/301,170

(22) PCT Filed: Jan. 27, 2015

(86) PCT No.: PCT/JP2015/000345
§ 371 (c)(1),
(2) Date: Sep. 30, 2016

(87) PCT Pub. No.: WO2015/159466
PCT Pub. Date: Oct. 22, 2015

(65) Prior Publication Data
US 2017/0025902 A1 Jan. 26, 2017

(30) Foreign Application Priority Data

Apr. 16, 2014 (JP) .................................. 2014-084455

(51) Int. Cl.
*B60K 1/04* (2019.01)
*B60L 11/18* (2006.01)
(Continued)

(52) U.S. Cl.
CPC ............... *H02J 50/12* (2016.02); *B60K 1/04* (2013.01); *B60L 53/12* (2019.02); *B60L 53/30* (2019.02); *B60L 53/36* (2019.02); *B60L 53/38* (2019.02); *H01F 27/362* (2013.01); *H01F 38/14* (2013.01); *H02J 50/70* (2016.02); *H02J 50/80* (2016.02); *H04B 5/0037* (2013.01); *H04B 5/0093* (2013.01); *B60K 2001/0438* (2013.01); *B60L 2270/147* (2013.01); *B60Y 2410/114* (2013.01);
(Continued)

(58) Field of Classification Search
USPC ......................................... 307/9.1, 10.1, 104
See application file for complete search history.

(56) References Cited

U.S. PATENT DOCUMENTS 7,741,734 B2    6/2010  Joannopoulos et al.
2007/0222542 A1 9/2007  Joannopoulos et al.
(Continued)

FOREIGN PATENT DOCUMENTS

AU    2006269374 C1    1/2007
AU    2006269374 B2    10/2009
(Continued)

Primary Examiner — Rexford N Barnie
Assistant Examiner — Xuan Ly
(74) Attorney, Agent, or Firm — Oliff PLC

(57) ABSTRACT

Provided is a vehicle including a floor panel, a power reception device including a secondary side core and a power reception coil wound around the secondary side core, and being attached to a lower surface of the floor panel to receive electric power from a power transmission device in a contactless manner while being opposed to the power transmission device, and a shield provided to cover at least a portion of the floor panel positioned around the secondary side core.

4 Claims, 11 Drawing Sheets

(51) Int. Cl.
*H01F 27/36* (2006.01)
*H01F 38/14* (2006.01)
*H02J 50/12* (2016.01)
*H02J 50/70* (2016.01)
*H02J 50/80* (2016.01)
*H04B 5/00* (2006.01)
*B60L 53/12* (2019.01)
*B60L 53/30* (2019.01)
*B60L 53/38* (2019.01)
*B60L 53/36* (2019.01)

(52) U.S. Cl.
CPC ........ *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2016/0156103 A1* | 6/2016 | Bae .................. H02J 50/20 320/108 |
| 2016/0236574 A1* | 8/2016 | Asai .................. H02J 50/70 |
| 2017/0033606 A1* | 2/2017 | Maikawa ............ H02J 50/70 |

FOREIGN PATENT DOCUMENTS

| | | |
|---|---|---|
| AU | 2007349874 A2 | 1/2010 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2012-204469 A | 10/2012 |
| JP | 2013-110822 A | 6/2013 |
| JP | 2013-126327 A | 6/2013 |
| JP | 2013-135572 A | 7/2013 |
| JP | 2013-146148 A | 7/2013 |
| JP | 2013-146154 A | 7/2013 |
| JP | 2013-154815 A | 8/2013 |
| JP | 2013-219861 A | 10/2013 |
| KR | 2008-0031398 A | 4/2008 |
| KR | 2010-0015954 A | 2/2010 |
| WO | 2007/008646 A1 | 1/2007 |
| WO | 2008/118178 A1 | 10/2008 |
| WO | 2011/112795 A1 | 9/2011 |
| WO | WO 2011/112795 * | 9/2011 |
| WO | 2013/150365 A2 | 10/2013 |

* cited by examiner

VEHICLE AND CONTACTLESS POWER TRANSFER SYSTEM

TECHNICAL FIELD

The present invention relates to a vehicle and a contactless power transfer system.

BACKGROUND ART

As disclosed in the following patent literatures 1 to 5, systems are known in which electric power is transferred in a contactless manner from a power transmission device provided outside a vehicle to a power reception device provided on the bottom surface of the vehicle. In the case of transferring electric power in a contactless manner, it is important to accurately align the power reception device and the power transmission device.

CITATION LIST

Patent Literature

[PTL 1] Japanese Patent Laying-Open No. 2013-154815
[PTL 2] Japanese Patent Laying-Open No. 2013-146154
[PTL 3] Japanese Patent Laying-Open No. 2013-146148
[PTL 4] Japanese Patent Laying-Open No. 2013-110822
[PTL 5] Japanese Patent Laying-Open No. 2013-126327

SUMMARY OF INVENTION

Technical Problem

Let it be assumed that a power reception device is mounted on the lower surface of a floor panel of a vehicle. Alignment between the power reception device and the power transmission device is important as described above, which, however, is difficult to perform accurately. In the case where electric power is transferred with inaccurate alignment, part of magnetic flux from the power transmission device that passes through the floor panel without being subject to power transfer increases. Since the floor panel is composed of a member made of metal, such as iron, the floor panel disadvantageously rises in temperature with increase in magnetic flux.

It is required to allow magnetic flux passing through the floor panel to be prevented from increasing even if alignment between the power reception device and the power transmission device has not been performed accurately.

Solution to Problem

A vehicle includes a floor panel, a power reception device including a secondary side core and a power reception coil wound around the secondary side core, and being attached to a lower surface of the floor panel to receive electric power from a power transmission device in a contactless manner while being opposed to the power transmission device, and a shield provided to cover at least a portion of the floor panel positioned around the secondary side core.

With the above-described configuration in which the shield is provided to cover at least a portion of the floor panel positioned around the secondary side core, the shield prevents leakage flux, if any, from traveling to pass through the floor panel. At least a portion of the floor panel positioned around the secondary side core is prevented from generating heat, and in turn various types of electronic devices located around the floor panel are also prevented from generating heat.

Preferably, the power reception coil is disposed to have a coil winding axis extending in a vehicle longitudinal direction. The floor panel includes a central tunnel extending in the vehicle longitudinal direction. The power reception device is disposed to straddle the central tunnel. The shield includes a first shielding part disposed such that its position in a vehicle width direction is located on the left side in the vehicle width direction with respect to the power reception device and a second shielding part disposed such that its position in the vehicle width direction is located on the right side in the vehicle width direction with respect to the power reception device.

With the above-described configuration, the magnetic field formed around the power reception coil is distributed to extend mainly in the vehicle longitudinal direction. At a portion of the floor panel positioned in the vehicle longitudinal direction of the power reception device, a central tunnel having a shape protruding upward, namely, a shape which is curved to be separate from the power reception coil, is formed. The portion of the floor panel positioned in the vehicle longitudinal direction of the power reception device is separate from the power reception device by the presence of the central tunnel. Therefore, magnetic flux can be prevented from reaching the portion of the floor panel positioned in the vehicle longitudinal direction of the power reception device.

With the above-described configuration in which the central tunnel is formed to extend in the vehicle longitudinal direction, the portion of the floor panel separate from the power reception device by the presence of the central tunnel also extends in the vehicle longitudinal direction. Therefore, even if the power reception device and the power transmission device are not aligned with each other in the vehicle longitudinal direction, magnetic flux is prevented from reaching the floor panel. On the other hand, since the first shielding part and the second shielding part are provided at portions adjacent to the power reception device in the vehicle width direction, magnetic flux can be prevented from reaching the floor panel even if the power reception device and the power transmission device are not aligned with each other in the vehicle width direction.

Preferably, a lower surface of the shield in the vertical direction is positioned above an upper surface of the secondary side core in the vertical direction.

With this configuration, the magnetic flux traveling from the power transmission device toward the power reception device is less likely to be blocked by the presence of the shield, which can prevent power transmission efficiency from decreasing.

A contactless power transfer system includes the above-described vehicle and a power transmission device including a primary side core and a power transmission coil wound around the primary side core. The vehicle or the power transmission device further includes a control unit configured to calculate a parameter relevant to power receiving efficiency of the power reception device. In the vehicle width direction, a width dimension of the primary side core is larger than the width dimension of the secondary side core. The shield includes a first protruding part protruding to the left side in the vehicle width direction with respect to the secondary side core and a second protruding part protruding to the right side in the vehicle width direction with respect to the secondary side core. An amount of protrusion of the first protruding part to the left side in the vehicle width direction with respect to the secondary side core and an amount of protrusion of the second protruding part to the right side in the vehicle width direction with respect to the secondary side core are each larger than the width dimension of the secondary side core in the vehicle width direction and smaller than the width dimension of the primary side core. When the parameter as calculated is smaller than a predetermined threshold, the control unit stops power transmission from the power transmission device to the power reception device.

Vehicles are generally parked in a parking space while moving in a backward or forward direction. By providing a wheel stopper or the like in the parking space, it is not difficult to reduce misalignment between the power reception device and the power transmission device in the vehicle longitudinal direction. On the other hand, misalignment in the vehicle width direction, which depends on the driver's skill, is likely to be larger than misalignment in the vehicle longitudinal direction. With the above-described configuration in which the shield has the first protruding part and the second protruding part protruding in the vehicle width direction with respect to the secondary side core, magnetic flux can be prevented from reaching the floor panel even if misalignment occurs in the vehicle width direction.

When the degree of misalignment between the primary side core and the secondary side core in the vehicle width direction becomes as large as the value of the width dimension of the primary side core, the power reception device can hardly receive electric power from the power transmission device. With the above-described configuration, power transmission and reception is stopped by the control unit when the parameter relevant to power receiving efficiency of the power reception device is smaller than the predetermined threshold. For example, let it be assumed that power transmission and reception is stopped by the control unit in the case where the degree of misalignment in the vehicle width direction between the primary side core and the secondary side core is as large as the value of the width dimension of the primary side core. Then, there will be little problem even if the above-described amount of protrusion is made smaller than the width dimension of the primary side core in the vehicle width direction. The above-described amount of protrusion refers to the amounts of protrusion of the first protruding part and the second protruding part to the opposite outer sides in the vehicle width direction with respect to the secondary side core.

The reason is because, even if the shield is provided at a portion where this amount of protrusion becomes more than or equal to the width dimension of the primary side core in the vehicle width direction, magnetic flux hardly reaches that portion, or even if magnetic flux reaches that portion, power transmission and reception is stopped by the control unit, so that the portion has little opportunity to exhibit the original shielding function. Therefore, by configuring as described above such that the amount of protrusion is made smaller than the width dimension of the primary side core in the vehicle width direction, and such that the shield is not provided at the portion where the shield will have little opportunity to exhibit its shielding function, the manufacturing cost of the shield can be reduced, and at the same time, weight reduction of the vehicle can be achieved.

On the other hand, the above-described amount of protrusion is larger than the width dimension of the secondary side core in the vehicle width direction. For example, in the case where the degree of misalignment in the vehicle width direction between the primary side core and the secondary side core is smaller than the width dimension of the secondary side core, the power reception device can receive much power from the power transmission device, and power transmission and reception is hardly stopped. Even if the degree of misalignment in the vehicle width direction between the primary side core and the secondary side core becomes as large as the value of the width dimension of the secondary side core, the shielding function is exhibited by the portion of the shield provided such that the above-described amount of protrusion is larger than the width dimension of the secondary side core in the vehicle width direction, and magnetic flux can be prevented from reaching the floor panel.

A contactless power transfer system includes the above-described vehicle and a power transmission device including a primary side core and a power transmission coil wound around the primary side core. The vehicle or the power transmission device further includes a control unit configured to calculate a parameter relevant to power receiving efficiency of the power reception device. In the vehicle width direction, a width dimension of the primary side core is larger than the width dimension of the secondary side core. The shield includes a third protruding part protruding to the front side in the vehicle longitudinal direction with respect to the secondary side core and a fourth protruding part protruding to the back side in the vehicle longitudinal direction with respect to the secondary side core. An amount of protrusion of the third protruding part to the front side in the vehicle longitudinal direction with respect to the secondary side core and an amount of protrusion of the fourth protruding part to the back side in the vehicle longitudinal direction with respect to the secondary side core are each larger than the length dimension of the secondary side core in the vehicle longitudinal direction and smaller than the length dimension of the primary side core. When the parameter as calculated is smaller than a predetermined threshold, the control unit stops power transmission from the power transmission device to the power reception device.

With the above-described configuration in which the shield has the third protruding part and the fourth protruding part protruding in the vehicle longitudinal direction with respect to the secondary side core, magnetic flux can be prevented from reaching the floor panel even if misalignment occurs in the vehicle longitudinal direction.

When the degree of misalignment in the vehicle longitudinal direction between the primary side core and the secondary side core becomes as large as the value of the length dimension of the primary side core, the power reception device can hardly receive electric power from the power transmission device. With the above-described configuration, in the case of the parameter relevant to power receiving efficiency of the power reception device is smaller than the predetermined threshold, power transmission and reception is stopped by the control unit. For example, let it be assumed that power transmission and reception is stopped by the control unit in the case where the degree of misalignment in the vehicle longitudinal direction between the primary side core and the secondary side core is as large as the value of the length dimension of the primary side core. Then, there will be little problem even if the above-described amount of protrusion is made smaller than the length dimension of the primary side core in the vehicle longitudinal direction. The above-described amount of protrusion refers to the amounts of protrusion of the third protruding part and the fourth protruding part to the opposite outer sides in the vehicle longitudinal direction with respect to the secondary side core.

The reason is because, even if the shield is provided at a portion where this amount of protrusion becomes more than or equal to the length dimension of the primary side core in the vehicle longitudinal direction, magnetic flux hardly reaches that portion, or even if magnetic flux reaches that portion, power transmission and reception is stopped by the control unit, so that the portion has little opportunity to exhibit the original shielding function. Therefore, by configuring as described above such that the amount of protrusion is made smaller than the length dimension of the primary side core in the vehicle longitudinal direction, and such that the shield is not provided at the portion where the shield will have little opportunity to exhibit its shielding function, the manufacturing cost of the shield can be reduced, and at the same time, weight reduction of the vehicle can be achieved.

On the other hand, the above-described amount of protrusion is larger than the length dimension of the secondary side core in the vehicle longitudinal direction. For example, in the case where the degree of misalignment in the vehicle longitudinal direction between the primary side core and the secondary side core is smaller than the length dimension of the secondary side core, the power reception device can receive much power from the power transmission device, and power transmission and reception is hardly stopped. Even if the degree of misalignment in the vehicle longitudinal direction between the primary side core and the secondary side core becomes as large as the value of the length dimension of the secondary side core, the shielding function is exhibited by the portion of the shield provided such that the above-described amount of protrusion is larger than the length dimension of the secondary side core in the vehicle longitudinal direction, and magnetic flux can be prevented from reaching the floor panel.

In a contactless power transfer system including a vehicle and a power transmission device, the vehicle includes a floor panel, a power reception device including a secondary side core and a power reception coil wound around the secondary side core, and being attached to a lower surface of the floor panel to receive electric power from the power transmission device in a contactless manner while being opposed to the power transmission device, and a shield provided to cover a portion of the floor panel positioned around the secondary side core. The power transmission device includes a primary side core and a power transmission coil wound around the primary side core. In a vehicle width direction, the width dimension of the primary side core is larger than the width dimension of the secondary side core. In the vehicle width direction, the distance between a portion of the shield positioned on the leftmost side in the vehicle width direction and a portion of the shield positioned on the rightmost side in the vehicle width direction is larger than the width dimension of the primary side core.

With the above-described configuration, in the vehicle width direction, the width dimension of the primary side core is larger than the width dimension of the secondary side core. In the vehicle width direction, the primary side core has a shape extending outwardly with respect to the secondary side core by the value obtained by subtracting the width dimension of the secondary side core from the width dimension of the primary side core. Therefore, occurrence of misalignment is allowable because the range where the cores can be opposed to each other is wide.

Furthermore, in the vehicle width direction, the distance between a portion of the shield positioned on the leftmost side in the vehicle width direction and a portion of the shield positioned on the rightmost side in the vehicle width direction is larger than the width dimension of the primary side core. The shield can exhibit a sufficient shielding function because the shield is provided over a wide area in the vehicle width direction.

Advantageous Effects of Invention

With the above-described respective configurations, magnetic flux passing through the floor panel can be prevented from increasing even if alignment between the power reception device and the power transmission device has not been performed accurately.

DESCRIPTION OF EMBODIMENTS

Figure 1:
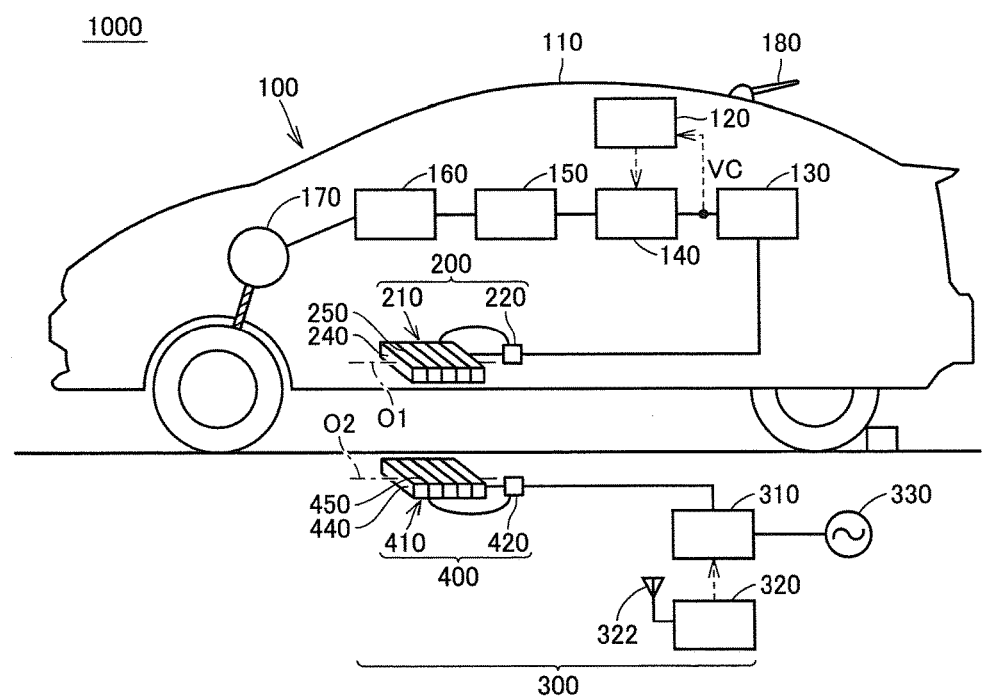
FIG. 1 shows a power transfer system according to a first embodiment.

Hereinafter, embodiments based on the present invention will be described with reference to the drawings. When the number, an amount or the like is mentioned, the scope of the present invention is not necessarily limited to that number, that amount or the like, unless otherwise specified. The same or corresponding parts are denoted by the same reference characters, and description thereof may not be repeated.

First Embodiment (Contactless Power Transfer System 1000)

Referring to FIG. 1, a contactless power transfer system 1000 according to a first embodiment will be described. Contactless power transfer system 1000 is provided with a vehicle 100 and an external power feeding apparatus 300. Vehicle 100 includes a vehicle main body 110 and a power reception device 200. Vehicle main body 110 has a vehicle ECU 120, a rectifier 130, a DC/DC converter 140, a battery 150, a power control unit 160, a motor unit 170, and a communication unit 180.

Power reception device 200, as opposed to a power transmission device 400 of external power feeding apparatus 300, receives electric power from power transmission device 400 in a contactless manner. Specifically, power reception device 200 includes a power reception unit 210 and a capacitor 220, and this power reception unit 210 includes a ferrite core 240 (secondary side core) and a power reception coil 250 wound around this ferrite core 240. Power reception coil 250 and capacitor 220 are connected in series, however, they may be connected in parallel.

Figure 2:
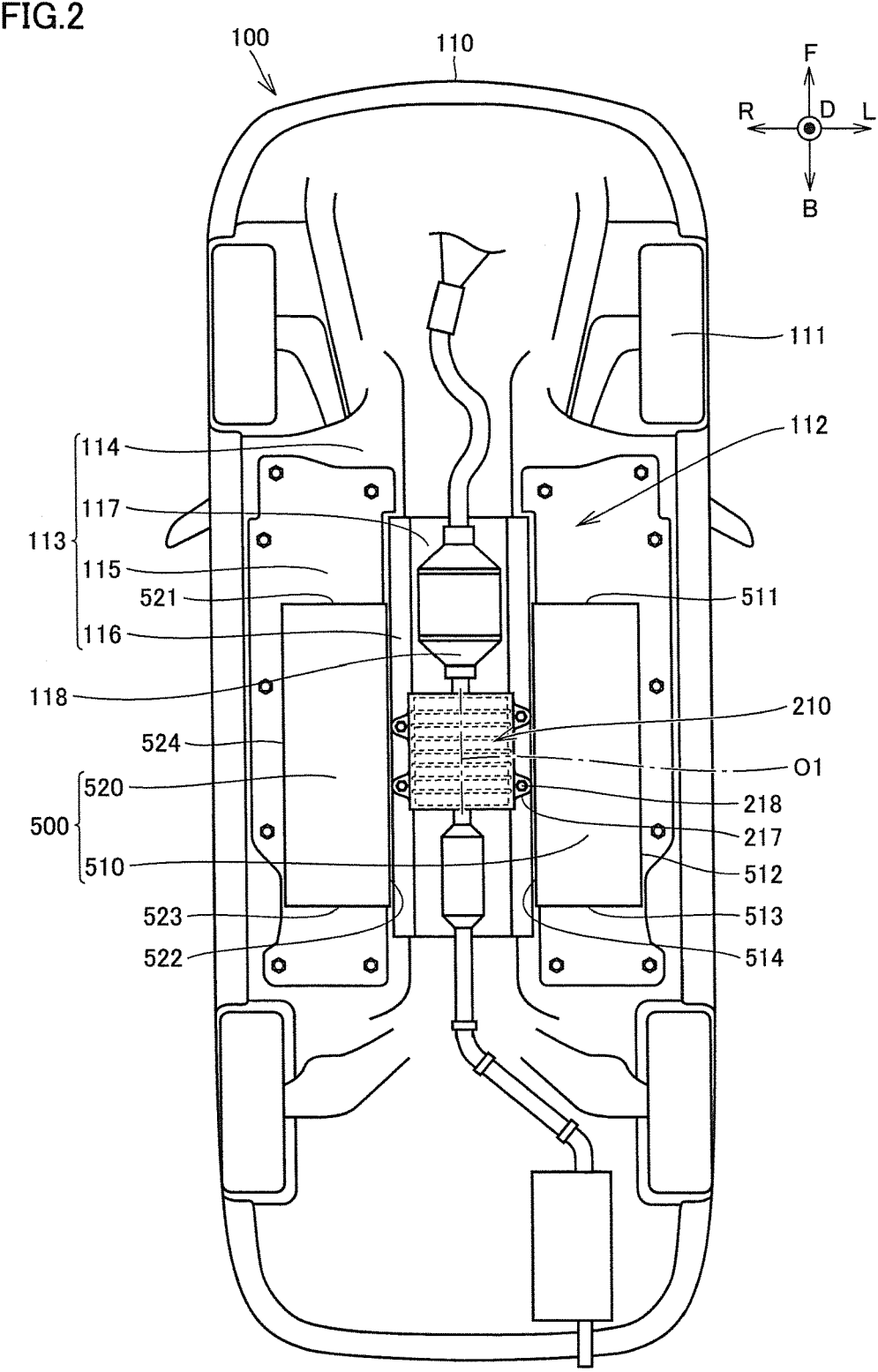
FIG. 2 is a bottom view showing a vehicle according to the first embodiment.

Power reception coil 250 is located such that a coil winding axis O1 of power reception coil 250 extends in the vehicle longitudinal direction (also see FIG. 2). The number of turns of power reception coil 250 is set appropriately such that the distance between power reception coil 250 and a power transmission coil 450 as well as a Q value (e.g., Q is more than or equal to 100) showing the intensity of the resonance between power reception coil 250 and power transmission coil 450 and a coupling coefficient k showing the degree of coupling thereof and the like become large.

External power feeding apparatus 300 is provided with power transmission device 400, a high frequency power device 310, a power transmission ECU 320, and a communication unit 322. High frequency power device 310 is connected to AC power supply 330 and power transmission device 400. Power transmission device 400 is provided with a power transmission unit 410 and a capacitor 420, and this power transmission unit 410 includes a ferrite core 440 (primary side core) and power transmission coil 450 wound around this ferrite core 440. Power transmission coil 450 and capacitor 420 are connected in series, however, they may be connected in parallel.

It is intended that when vehicle 100 stops at a position where power transfer is available, coil winding axis O1 of power reception coil 250 and a coil winding axis O2 of power transmission coil 450 become parallel to each other. High frequency power device 310 converts electric power received from AC power supply 330 into high frequency power, and supplies the high frequency power to power transmission coil 450. Power transmission coil 450 transmits electric power in a contactless manner to power reception coil 250 of power reception unit 210 by electromagnetic induction.

(Bottom Structure of Vehicle 100)

FIG. 2 is a bottom view showing vehicle 100. An arrow D indicates the downward side in the vertical direction. An arrow U (see FIG. 3) indicates the upward side in the vertical direction. An arrow L indicates the left direction of the vehicle. An arrow R indicates the right direction of the vehicle. An arrow F indicates the vehicle forward direction. An arrow B indicates the backward direction of the vehicle. These also apply in common to FIGS. 3 to 15 which will be described later.

As shown in FIG. 2, vehicle main body 110 of vehicle 100 has a bottom 112. Bottom 112 refers to a visible region of vehicle main body 110 when viewed from a position sufficiently spaced from vehicle main body 110 downward in the vertical direction with respect to the ground with four wheels 111 being grounded. Bottom 112 is provided with a floor panel 113, an exhaust pipe 118, power reception device 200 (power reception unit 210), a shield 500, a side member and a cross member not shown, and the like. Hereinafter, they will be described sequentially.

(Floor Panel 113)

Figure 3:
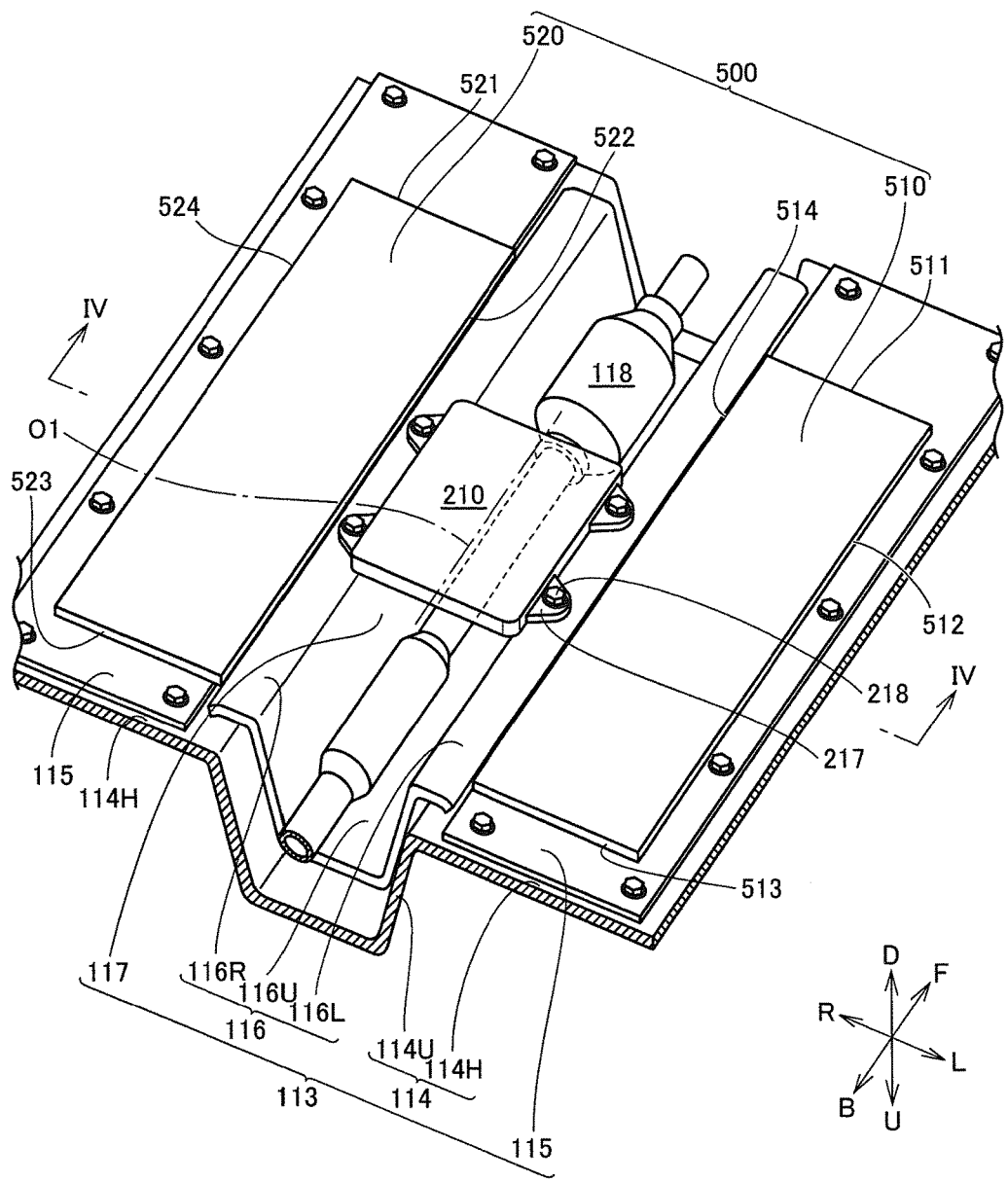
FIG. 3 is a perspective view showing part of a bottom structure (such as a power reception unit and a shield) of the vehicle according to the first embodiment.
Figure 4:
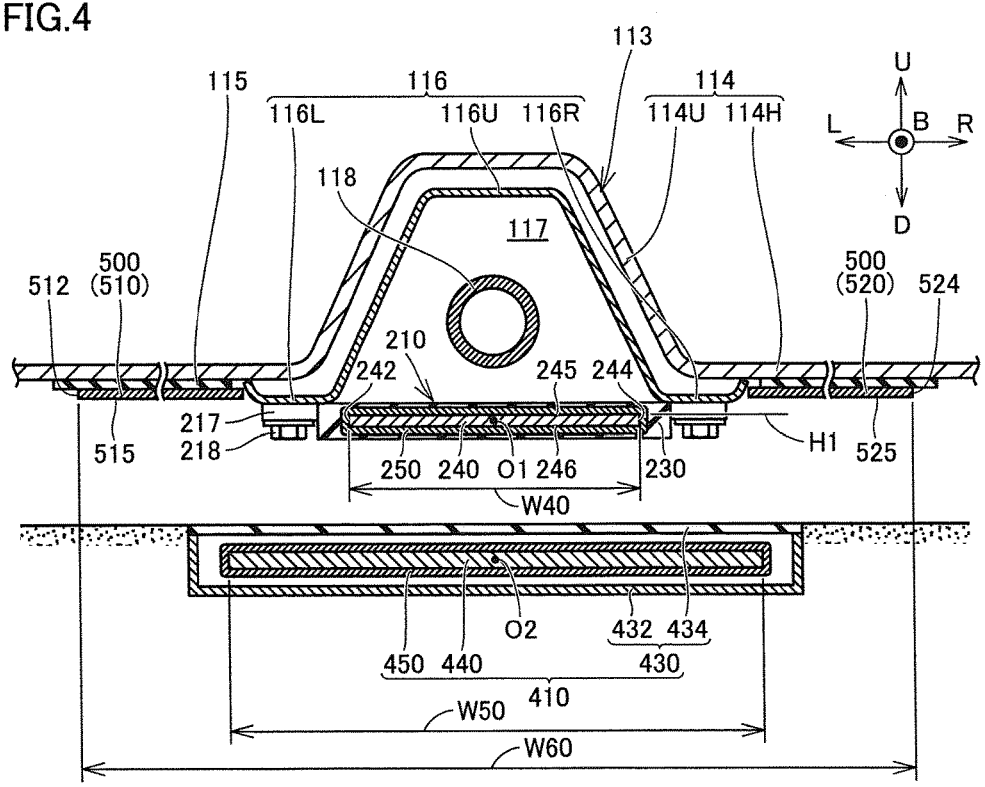
FIG. 4 is a cross-sectional view taken along the line IV-IV in FIG. 3.

FIG. 3 is a perspective view showing part of the bottom structure (such as power reception unit 210 and shield 500) of vehicle 100. FIG. 4 is a cross-sectional view taken along the line IV-IV in FIG. 3. As shown in FIGS. 2 to 4, floor panel 113 includes a panel main body 114, a pair of covers 115, a reinforcement 116, and a central tunnel 117.

Panel main body 114 is made of iron, for example, and constitutes a structural member of vehicle main body 110 along with the side member, the cross member, and the like. Panel main body 114 has a flat plate part 114H (FIGS. 3 and 4) and a recess 114U (FIGS. 3 and 4). Recess 114U is positioned at the center of vehicle main body 110 in the width direction (the direction of arrows L and R), and has a shape which is curved in a nearly U-shape upward in the vertical direction (arrow U).

Pair of covers 115 are members made of resin having a flat-plate like shape, and are each attached to flat plate part 114H of panel main body 114. Pair of covers 115 cover flat plate part 114H positioned at a side of recess 114U in the left direction of the vehicle (arrow L) and flat plate part 114H positioned at a side of recess 114U in the right direction of the vehicle (arrow R), respectively.

Reinforcement 116 has a pair of flanges 116L and 116R, as well as a recess 116U. Recess 116U is provided between flanges 116L and 116R. Flange 116L extends in the plate form in the left direction of the vehicle from the bottom end positioned at a side of recess 116U in the left direction of the vehicle (arrow L). Flange 116R extends in the plate form in the right direction of the vehicle from the bottom end positioned at a side of recess 116U in the right direction of the vehicle (arrow R).

Recess 116U of reinforcement 116 has a shape which is curved in a nearly U-shape upward in the vertical direction (arrow U), and is located inside recess 114U of panel main body 114. Central tunnel 117 in which exhaust pipe 118 is to be disposed is formed in the inner space of recess 116U of reinforcement 116. Central tunnel 117 is in parallel to the longitudinal direction of vehicle main body 110 (the direction of arrows F and B).

(Power Reception Unit 210)

Figure 5:
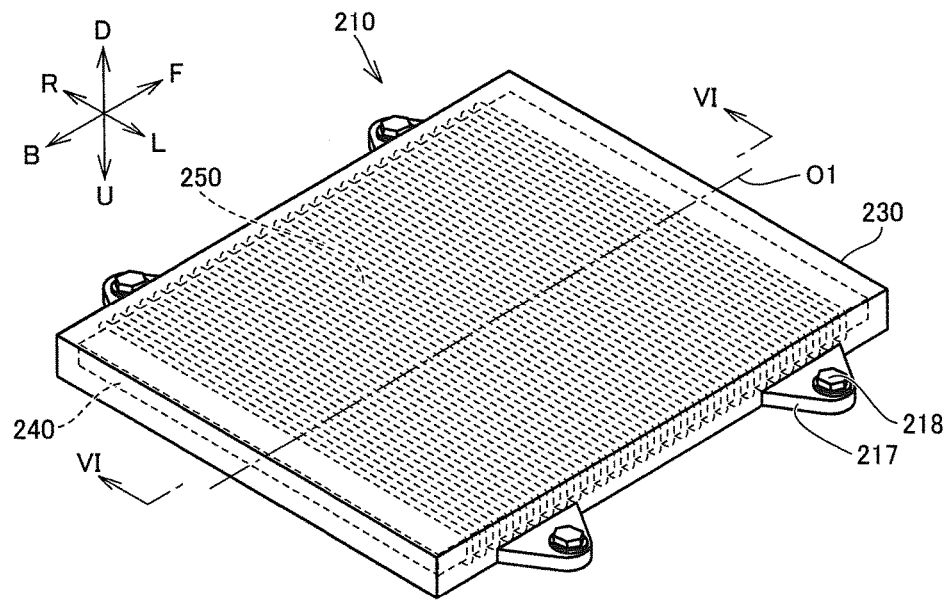
FIG. 5 is a perspective view showing the power reception unit provided for the vehicle according to the first embodiment.
Figure 6:
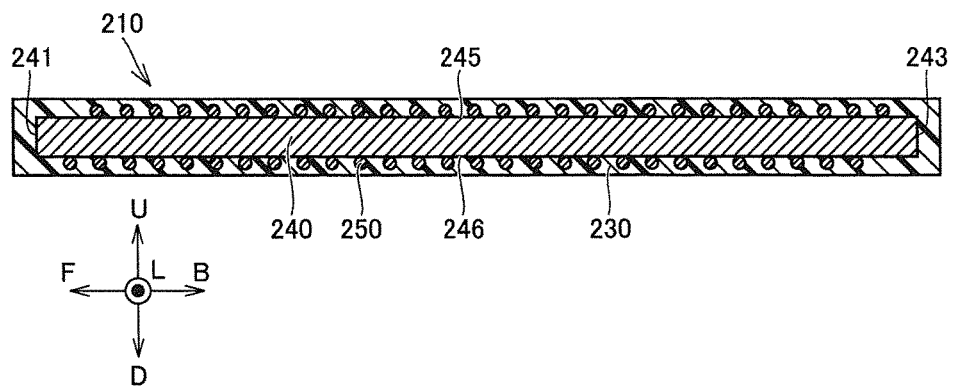
FIG. 6 is a cross-sectional view taken along the line VI-VI in FIG. 5.
Figure 7:
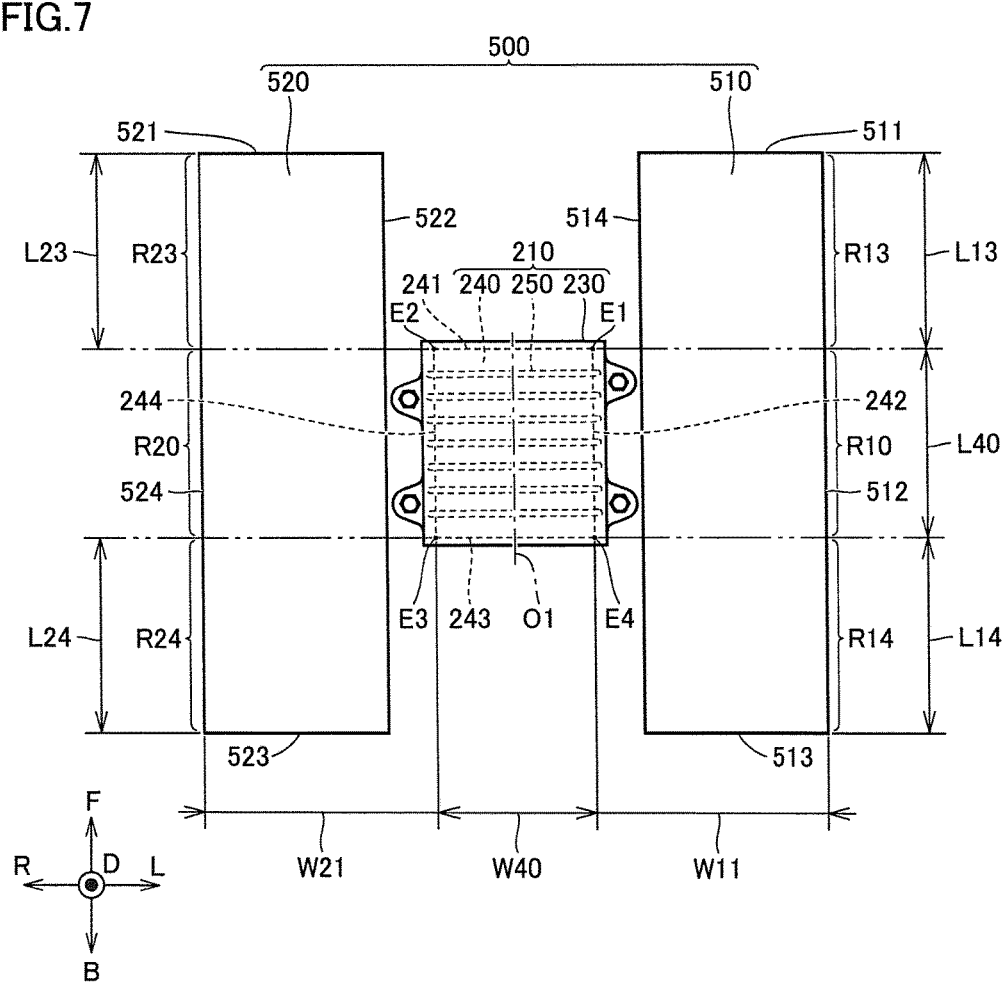
FIG. 7 is an enlarged bottom view showing part of the vehicle (the power reception unit and the shield) shown in FIG. 2.

FIG. 5 is a perspective view showing power reception unit 210. FIG. 6 is a cross-sectional view taken along the line VI-VI in FIG. 5. FIG. 7 is an enlarged bottom view showing part of vehicle 100 (power reception unit 210 and shield 500) shown in FIG. 2. Referring to FIGS. 2 to 7, power reception unit 210 includes a resin member 230 (FIGS. 4 to 6), ferrite core 240 (secondary side core), and power reception coil 250.

As described above, power reception coil 250 is wound around ferrite core 240, and coil winding axis O1 of power reception coil 250 extends in the vehicle longitudinal direction (see FIG. 2). Ferrite core 240 includes side surfaces 241 to 244 (FIG. 7), an upper surface 245 (FIGS. 4 and 6) and a lower surface 246 (FIGS. 4 and 6), and has a rectangular parallelopiped shape as a whole. Side surfaces 241 and 243 (FIGS. 6 and 7) are in parallel to the width direction of vehicle main body 110 (the direction of arrows L and R). Side surfaces 242 and 244 (FIGS. 4 and 7) are in parallel to the longitudinal direction of vehicle main body 110 (the direction of arrows F and B).

Resin member 230 (FIGS. 4 to 6) includes an upper surface, a lower surface and four side surfaces, and has a rectangular parallelopiped shape as a whole. Resin member 230 seals therein ferrite core 240 and power reception coil 250. Resin member 230 is made of polyester having non-flammability, for example. Four flanges 217 (FIGS. 2 to 5) are provided around resin member 230. Flanges 217 are provided integrally with resin member 230 by insert molding or the like. In plan view, the outer diameter of a portion of resin member 230 excluding flanges 217 is about 240 mm×about 290 mm, for example.

Flanges 217 each have a hole (not shown) through which a bolt 218 is to be inserted. Flanges 116L and 116R of reinforcement 116 (FIGS. 3 and 4) are provided with female screws (not shown) at positions corresponding to flanges 217. Flanges 217 are fixed to flanges 116L and 116R with bolts 218. On this occasion, nuts may be used. Power reception unit 210 is fixed to reinforcement 116 by fastening bolts 218. With this fastening, power reception unit 210 (power reception device 200) is attached to the lower surface of floor panel 113 (specifically, panel main body 114) while straddling central tunnel 117.

(Shield 500)

Referring to FIGS. 2 to 4 and 7, shield 500 is provided at bottom 112 of vehicle main body 110 as described above. Shield 500 prevents magnetic flux when arriving at shield 500 from traveling through shield 500. Shield 500 is made of aluminum or copper, for example. Shield 500 has a thickness of 0.5 mm, for example.

Shield 500 is provided to cover at least a portion of floor panel 113 positioned around ferrite core 240. The portion positioned around ferrite core 240 refers to a portion positioned within the range of 500 mm, for example, from side surfaces 241 to 244 (FIG. 7), upper surface 245 (FIGS. 4 and 6), lower surface 246 of ferrite core 240, and respective corners E1 to E4 of ferrite core 240 (see FIG. 7). Shield 500 of the present embodiment includes a first shielding part 510 and a second shielding part 520.

(First Shielding Part 510)

As shown in FIGS. 2, 3 and 7, first shielding part 510 is provided with outer edges 511 to 514, and has a flat-plate like shape as a whole. Outer edges 511 and 513 are in parallel to the width direction of vehicle main body 110 (the direction of arrows L and R). Outer edges 512 and 514 are in parallel to the longitudinal direction of vehicle main body 110 (the direction of arrows F and B).

First shielding part 510 is disposed such that the position of outer edge 514 in the vehicle width direction (the direction of arrows L and R) is located on the left side of power reception device 200 (power reception unit 210) in the vehicle width direction, and is attached to the lower surface of cover 115 (FIG. 3) with a screw, a clip or the like not shown. As shown in FIG. 4, preferably, a lower surface 515 of first shielding part 510 in the vertical direction may be positioned above upper surface 245 of ferrite core 240 in the vertical direction (at a height position H1).

Referring to FIG. 7, first shielding part 510 of the present embodiment includes three parts: a protruding part R10 (first protruding part); a protruding part R13 (third protruding part); and a protruding part R14 (fourth protruding part). Protruding part R10 has a shape protruding to the left side in the vehicle width direction (to the arrow L side) with respect to side surface 242 of ferrite core 240 (that is, a shape extending away from side surface 242 to the arrow L side). Preferably, an amount of protrusion W11 of protruding part R10 to the left side in the vehicle width direction with respect to ferrite core 240 is larger than a width dimension W40 of ferrite core 240 in the same direction and is smaller than a width dimension W50 (FIGS. 4, 9 and 10) of ferrite core 440 (FIGS. 4, 9 and 10) in the same direction. The amount of protrusion W11 refers to the distance in the vehicle width direction from side surface 242 of ferrite core 240 to outer edge 512 of first shielding part 510.

Protruding part R13 has a shape protruding to the front side in the vehicle longitudinal direction (to the arrow F side) with respect to side surface 241 of ferrite core 240 (that is, a shape extending away from side surface 241 to the arrow F side). Preferably, an amount of protrusion L13 of protruding part R13 to the front side in the vehicle longitudinal direction with respect to ferrite core 240 is larger than a length dimension L40 of ferrite core 240 in the same direction and is smaller than a length dimension L50 (FIGS. 4, 11 and 12) of ferrite core 440 (FIGS. 4, 11 and 12) in the same direction. The amount of protrusion L13 refers to the distance in the vehicle longitudinal direction from side surface 241 of ferrite core 240 to outer edge 511 of first shielding part 510.

Protruding part R14 has a shape protruding to the back side in the vehicle longitudinal direction (to the arrow B side) with respect to side surface 243 of ferrite core 240 (that is, a shape extending away from side surface 243 to the arrow B side). Preferably, an amount of protrusion L14 of protruding part R14 to the back side in the vehicle longitudinal direction with respect to ferrite core 240 is larger than length dimension L40 of ferrite core 240 in the same direction and is smaller than length dimension L50 (FIGS. 4, 13 and 14) of ferrite core 440 (FIGS. 4, 13 and 14) in the same direction. The amount of protrusion L14 refers to the distance in the vehicle longitudinal direction from side surface 243 of ferrite core 240 to outer edge 513 of first shielding part 510.

(Second Shielding Part 520)

As shown in FIGS. 2, 3 and 7, second shielding part 520 is provided with outer edges 521 to 524, and has a flat-plate like shape as a whole. Outer edge 521 and 523 are in parallel to the width direction of vehicle main body 110 (the direction of arrows L and R). Outer edges 522 and 524 are in parallel to the longitudinal direction of vehicle main body 110 (the direction of arrows F and B).

Second shielding part 520 is disposed such that the position of outer edge 522 in the vehicle width direction (the direction of arrows L and R) is located on the right side of power reception device 200 (power reception unit 210) in the vehicle width direction, and is attached to the lower surface of cover 115 (FIG. 3) with a screw, a clip or the like not shown. As shown in FIG. 4, preferably, a lower surface 525 of second shielding part 520 in the vertical direction may be positioned above upper surface 245 of ferrite core 240 in the vertical direction (at height position H1).

Referring to FIG. 7, second shielding part 510 of the present embodiment includes three parts: protruding part R20 (second protruding part); a protruding part R23 (third protruding part); and a protruding part R24 (fourth protruding part). Protruding part R20 has a shape protruding to the right side in the vehicle width direction (to the arrow R side) with respect to side surface 244 of ferrite core 240 (that is, a shape extending away from side surface 244 to the arrow R side). Preferably, an amount of protrusion W21 of protruding part R20 to the right side in the vehicle width direction with respect to ferrite core 240 is larger than a width dimension W40 of ferrite core 240 in the same direction and is smaller than width dimension W50 (FIG. 4) of ferrite core 440 (FIG. 4) in the same direction. The amount of protrusion W21 refers to the distance in the vehicle width direction from side surface 244 of ferrite core 240 to outer edge 522 of second shielding part 520.

Protruding part R23 has a shape protruding to the front side in the vehicle longitudinal direction (to the arrow F side) with respect to side surface 241 of ferrite core 240 (that is, a shape extending away from side surface 241 to the arrow F side). Preferably, an amount of protrusion L23 of protruding part R23 to the front side in the vehicle longitudinal direction with respect to ferrite core 240 is larger than length dimension L40 of ferrite core 240 in the same direction and is smaller than length dimension L50 (FIG. 4) of ferrite core 440 (FIG. 4) in the same direction. The amount of protrusion L23 refers to the distance in the vehicle longitudinal direction from side surface 241 of ferrite core 240 to outer edge 521 of second shielding part 520.

Protruding part R24 has a shape protruding to the back side in the vehicle longitudinal direction (to the arrow B side) with respect to side surface 243 of ferrite core 240 (that is, a shape extending away from side surface 243 to the arrow B side). Preferably, an amount of protrusion L24 of protruding part R24 to the back side in the vehicle longitudinal direction with respect to ferrite core 240 is larger than length dimension L40 of ferrite core 240 in the same direction and is smaller than length dimension L50 (FIG. 4) of ferrite core 440 (FIG. 4) in the same direction. The amount of protrusion L24 refers to the distance in the vehicle longitudinal direction from side surface 243 of ferrite core 240 to outer edge 523 of second shielding part 520.

(Power Transmission Unit 410)

Referring again to FIG. 4, power transmission unit 410 includes a case member 430, ferrite core 440 (primary side core) and power transmission coil 450. Case member 430 includes a storage unit 432 made of metal and a lid 434 made of resin. Storage unit 432 has a shape which opens upward in the vertical direction, and lid 434 blocks the opening of storage unit 432. Ferrite core 440 and power transmission coil 450 are stored in case member 430.

In the present embodiment, width dimension W50 of ferrite core 440 is larger than width dimension W40 of ferrite core 240 in the vehicle width direction. In the vehicle width direction, a distance W60 between outer edge 512 of first shielding part 510 and outer edge 524 of second shielding part 520 is larger than width dimension W50 of ferrite core 440. Outer edge 512 of first shielding part 510 corresponds to a portion of shield 500 positioned on the leftmost side in the vehicle width direction, and outer edge 524 of second shielding part 520 corresponds to a portion of shield 500 positioned on the rightmost side in the vehicle width direction.

(Functions and Effects)

Figure 8:
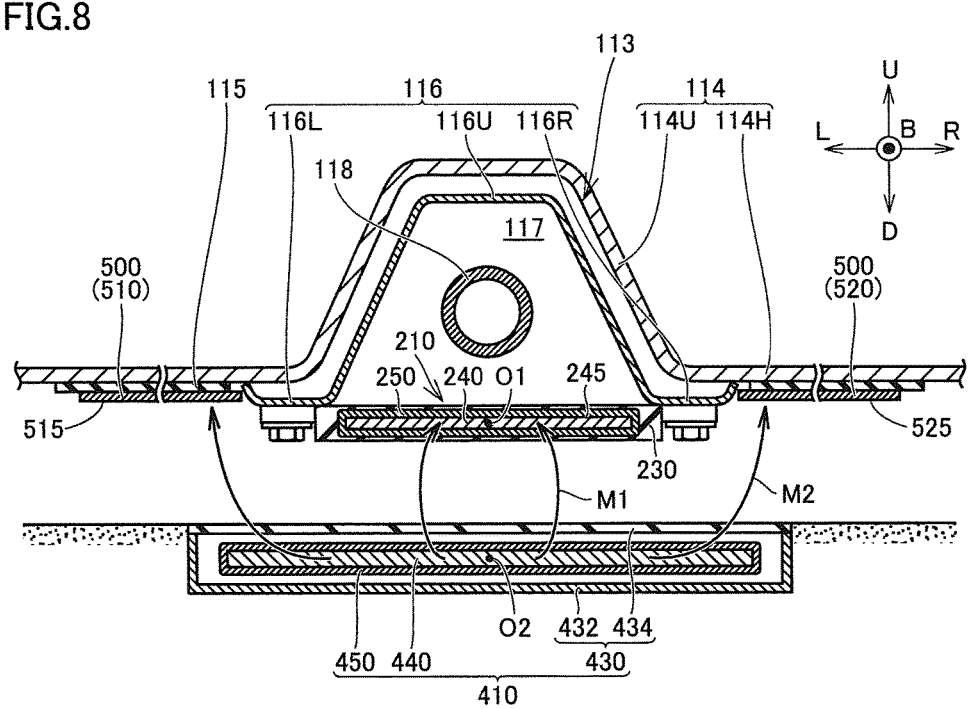
FIG. 8 illustrates functions and effects according to the first embodiment.

Referring to FIG. 8, functions and effects according to the first embodiment will be described. Vehicles are generally parked in a parking space while moving in a backward or forward direction. Therefore, by providing a wheel stopper (not shown) or the like in the parking space, it is not difficult to reduce misalignment between power reception unit 210 and power transmission unit 410 in the vehicle longitudinal direction. On the other hand, misalignment in the vehicle width direction is likely to be larger than misalignment in the vehicle longitudinal direction. Let it be assumed that width dimension W40 (FIG. 4) of ferrite core 240 is equal to width dimension W50 (FIG. 4) of ferrite core 440. In this case, when misalignment in the vehicle width direction occurs, the distance between power reception unit 210 and power transmission unit 410 will increase. The magnetic field will become weaker because ferrite core 240 and ferrite core 440 are no longer opposed to each other, so that transmission efficiency will also be likely to decrease.

In the present embodiment, width dimension W50 of ferrite core 440 is larger than width dimension W40 of ferrite core 240. In the vehicle width direction, ferrite core 440 has a shape extending outward with respect to ferrite core 240 by the value of (W50−W40). Therefore, contactless power transfer system 1000 (FIG. 1), in which the range where ferrite core 240 and ferrite core 440 can be opposed to each other is larger by the value of (W50−W40), allows for the occurrence of misalignment. Even if misalignment occurs by a value less than or equal to the value of (W50−W40), decrease in coupling coefficient hardly occurs.

Referring to FIG. 8, in power transfer, part of magnetic flux from power transmission unit 410 (an arrow M1 in FIG. 8) travels toward power reception unit 210 to be served for power transfer. Another part of magnetic flux from power transmission unit 410 (an arrow M2 in FIG. 8) approaches power reception unit 210, but may become leakage flux without being served for power transfer. In the case where leakage flux travels to pass through floor panel 113 (panel main body 114), floor panel 113 (panel main body 114) will rise in temperature. Leakage flux is likely to be produced in the case where the misalignment between power reception unit 210 and power transmission unit 410 in the vehicle width direction is large. Leakage flux is likely to be produced in the case where width dimension W50 of ferrite core 440 (FIG. 4) is larger than width dimension W40 of ferrite core 240 (FIG. 4).

In the present embodiment, shield 500 is provided to cover at least a portion of floor panel 113 positioned around ferrite core 240. Even if leakage flux is produced (arrow M2 in FIG. 8), shield 500 (first shielding part 510 and second shielding part 520) prevents the leakage flux from traveling to pass through floor panel 113 (panel main body 114). At least a portion of floor panel 113 positioned around ferrite core 240 is prevented from generating heat, and in turn, various types of electronic devices arranged therearound are also prevented from generating heat.

In the present embodiment (see FIG. 4), coil winding axis O1 of power reception coil 250 extends in the vehicle longitudinal direction, and floor panel 113 includes central tunnel 117 extending in the vehicle longitudinal direction. Power reception unit 210 of power reception device 200 is arranged to straddle central tunnel 117. Let it be assumed that recess 114U (a feature for forming the central tunnel) is not provided for panel main body 114 but panel main body 114 has a flat-plate like shape, magnetic flux directed from ferrite core 440 toward ferrite core 240 will be likely to reach panel main body 114 as well.

According to the present embodiment, power reception unit 210 and panel main body 114 (inner surface of recess 114U) are separated from each other by the space in which central tunnel 117 is formed. Therefore, magnetic flux directed from ferrite core 440 toward ferrite core 240 can be prevented from reaching panel main body 114 because of the formation of recess 114U. On the other hand, portions of panel main body 114 positioned on the both sides of central tunnel 117 in the vehicle width direction are close to power transmission unit 410 as compared with the inner surface of recess 114U. The portions can be protected by first shielding part 510 and second shielding part 520. Only either one of first shielding part 510 and second shielding part 520 may be used. As will be described later with reference to FIGS. 14 and 15, first shielding part 510 and second shielding part 520 may be integrated together. In this case, first shielding part 510 and second shielding part 520 each correspond to a portion of shield 500C or 500D having a shape of a piece of flat plate.

In the present embodiment (see FIG. 4), lower surfaces 515 and 525 of shield 500 (first shielding part 510 and second shielding part 520) in the vertical direction are positioned above upper surface 245 of ferrite core 240 in the vertical direction. With this configuration, magnetic flux traveling from power transmission unit 410 toward power reception unit 210 is less likely to be blocked by the presence of shield 500, which can prevent the power transmission efficiency from decreasing. Depending on the arrangement relationship between devices and members arranged around shield 500, part or all of lower surfaces 515 and 525 of shield 500 (first shielding part 510 and second shielding part 520) in the vertical direction may be configured to be positioned below upper surface 245 of ferrite core 240 in the vertical direction.

In the above-described embodiment (see FIG. 7), let it be assumed that the amount of protrusion W11 of protruding part R10 (first protruding part) to the left side in the vehicle width direction with respect to ferrite core 240 and the amount of protrusion W21 of protruding part R20 (second protruding part) to the right side in the vehicle width direction with respect to ferrite core 240 are both configured to be larger than width dimension W40 of ferrite core 240 in the vehicle width direction and smaller than width dimension W50 (FIG. 4) of ferrite core 440 (FIG. 4) in the same direction. With this configuration, even if the degree of misalignment in the vehicle width direction is large, heat generation of floor panel 113 resulting from leakage flux can be prevented. Protruding parts R10 and R20 are not essential features, but are preferably provided according to necessity. As will be described later, protruding parts R10 and R20 can also be each provided as a portion of shield 500C or 500D (FIG. 14 or 15) having a shape of a piece of flat plate.

In the above-described embodiment (see FIG. 7), let it be assumed that the amounts of protrusions L13 and L23 of protruding parts R13 and R23 (third protruding parts) to the front side in the vehicle longitudinal direction with respect to ferrite core 240 and the amounts of protrusion L14 and L24 of protruding parts R14 and R24 (fourth protruding parts) to the back side in the vehicle longitudinal direction with respect to ferrite core 240 are both configured to be larger than length dimension L40 of ferrite core 240 in the vehicle longitudinal direction and smaller than length dimension L50 (FIGS. 4, 11 and 12) of ferrite core 440 (FIGS. 4, 11 and 12) in the same direction. With this configuration, even if the degree of misalignment in the vehicle longitudinal direction is large, heat generation of floor panel 113 resulting from leakage flux can be prevented. Protruding parts R13, R23, R14, and R24 are not essential features, but are preferably provided according to necessity. As will be described later, protruding parts R13, R23, R14, and R24 can also be each provided as a portion of shield 500C or 500D (FIG. 14 or 15) having a shape of a piece of flat plate.

Vehicle ECU 120 (FIG. 1) as a control unit may be configured to calculate a parameter relevant to power receiving efficiency of power reception device 200. In this case, a voltage sensor not shown is provided for an electric power line connecting rectifier 130 (FIG. 1) and DC/DC converter 140 (FIG. 1), for example. The voltage sensor detects a DC voltage on the secondary coil side of rectifier 130, that is, the voltage of electric power received by power reception device 200 from power transmission device 400, and outputs a detected value VC (FIG. 1) to vehicle ECU 120.

Vehicle ECU 120 calculates the parameter relevant to power receiving efficiency of power reception device 200 based on the value of voltage VC (detected value), and transmits information on the power receiving efficiency to power transmission device 400 through communication units 180 and 322 (FIG. 1). Vehicle ECU 120 may transmit a signal for stopping power transmission from power transmission device 400 to power reception device 200, in the case where the calculated parameter is smaller than a predetermined threshold. On this occasion, a signal requesting a user to perform an alignment operation again may be transmitted. With these configurations, heat generation of floor panel 113 resulting from leakage flux can further be prevented.

(First Variation)

Figure 9:
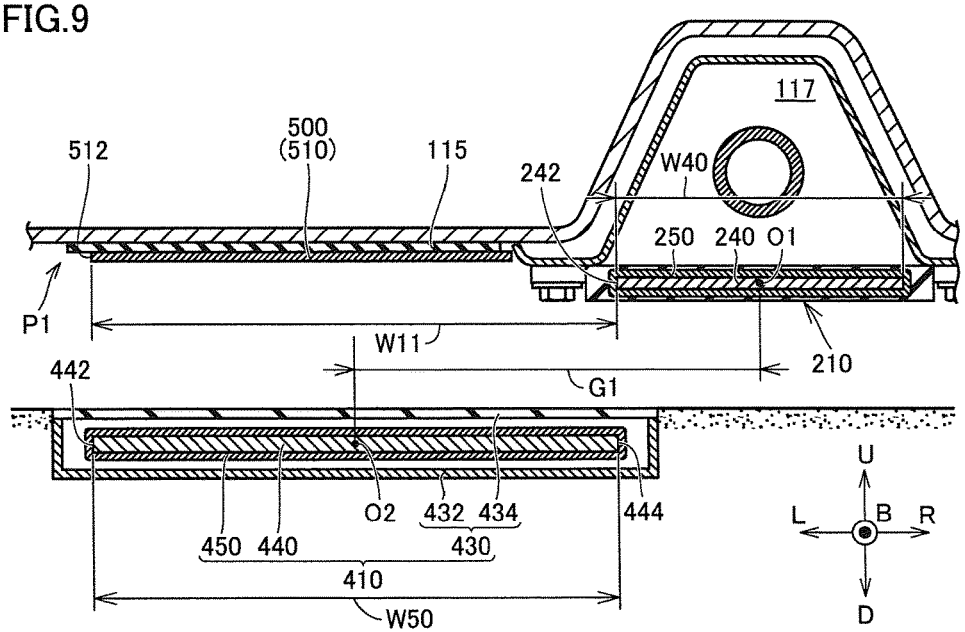
FIG. 9 illustrates functions and effects according to a first variation of the first embodiment.

Referring to FIG. 9, as described above, misalignment in the vehicle width direction, which depends on the driver's skill, is likely to be larger than misalignment in the vehicle longitudinal direction. FIG. 9 shows the state where the vehicle is stopped on the right side (the arrow R side) in the vehicle width direction with respect to a specified position and a degree of misalignment G1 in the vehicle width direction between ferrite core 440 and ferrite core 240 has become as large as the value of width dimension W50 of ferrite core 440 (degree of misalignment G1 is nearly equal to the value of width dimension W50 of ferrite core 440). Degree of misalignment G1 as used herein is the distance in the vehicle width direction between the position of coil winding axis O1 of power reception coil 250 and coil winding axis O2 of power transmission coil 450.

In such a state, power reception unit 210 of the power reception device can hardly receive electric power from power transmission unit 410 of the power transmission device. Vehicle ECU 120 (FIG. 1) as a control unit calculates a parameter relevant to power receiving efficiency of power reception device 200, and in the case where the calculated parameter is smaller than a predetermined threshold, transmits a signal for stopping power transmission from power transmission device 400 to power reception device 200.

For example, let it be assumed that power transmission and reception is stopped when degree of misalignment G1 in the vehicle width direction between ferrite core 440 and ferrite core 240 is as large as the value of width dimension W50 of ferrite core 440. In such a case, there will be little problem even if the amount of protrusion W11 (FIGS. 7 and 9) to the left side of protruding part R10 (FIG. 7) of first shielding part 510 in the vehicle width direction with respect to ferrite core 240 is made smaller than the value of width dimension W50 of ferrite core 440 in the vehicle width direction.

The reason is because, even if a shield is provided at a portion where this amount of protrusion W11 (FIG. 9) becomes more than or equal to the value of width dimension W50 of ferrite core 440 in the vehicle width direction (a portion indicated by an arrow P1 in FIG. 9), magnetic flux hardly reaches that portion, or in the case where magnetic flux reaches that portion, power transmission and reception is stopped by vehicle ECU 120 (control unit). Even if the shield (protruding part R10) is provided to reach the portion indicated by arrow P1, that portion has little opportunity to exhibit the original shielding function. Therefore, by configuring such that the amount of protrusion W11 (FIGS. 7 and 9) is made smaller than the value of width dimension W50 of ferrite core 440 in the vehicle width direction and such that the shield is not provided at the portion where the shield will have little opportunity to exhibit its shielding function, the manufacturing cost of the shield can be reduced, and at the same time, weight reduction of the vehicle can be achieved.

On the other hand, the above-described amount of protrusion W11 (FIG. 9) is preferably made larger than the value of width dimension W40 of ferrite core 240 in the vehicle width direction. For example, in the case where degree of misalignment G1 in the vehicle width direction between ferrite core 440 and ferrite core 240 is smaller than the value of width dimension W40 of ferrite core 240, the power reception device can receive a large amount of electric power from the power transmission device, and power transmission and reception is hardly stopped. Even if degree of misalignment G1 becomes as large as the value of width dimension W40 of ferrite core 240, the shielding function is exhibited by the portion of the shield provided such that the amount of protrusion W11 becomes larger than the value of width dimension W40 of ferrite core 240 in the vehicle width direction, which can prevent magnetic flux from reaching the floor panel.

Functions and effects similar to those of the configuration described above as the first variation can be applied to the amount of protrusion W21 (FIG. 7) of protruding part R20 (FIG. 7) of second shielding part 520 to the right side in the vehicle width direction with respect to ferrite core 240. Moreover, the above-described first variation was described based on the configuration where a voltage sensor (not shown) is provided for the electric power line connecting rectifier 130 (FIG. 1) and DC/DC converter 140 (FIG. 1) to detect the voltage of electric power received by power reception device 200 from power transmission device 400, and detected value VC (FIG. 1) is output to vehicle ECU 120. The configuration for calculating a parameter relevant to power receiving efficiency of power reception device 200 is not limited to the above-described one. The parameter relevant to power receiving efficiency of power reception device 200 may be power receiving efficiency itself obtained from transmitted electric power and received electric power, or a parameter that influences on power receiving efficiency, such as the degree of misalignment or reflection power. For acquisition of this parameter, a parameter obtained on the power transmission side may also be transmitted to the power reception side through communication. In this case, power transmission ECU 320 (FIG. 1) is configured to function as a control unit.

(Second Variation)

Figure 10:
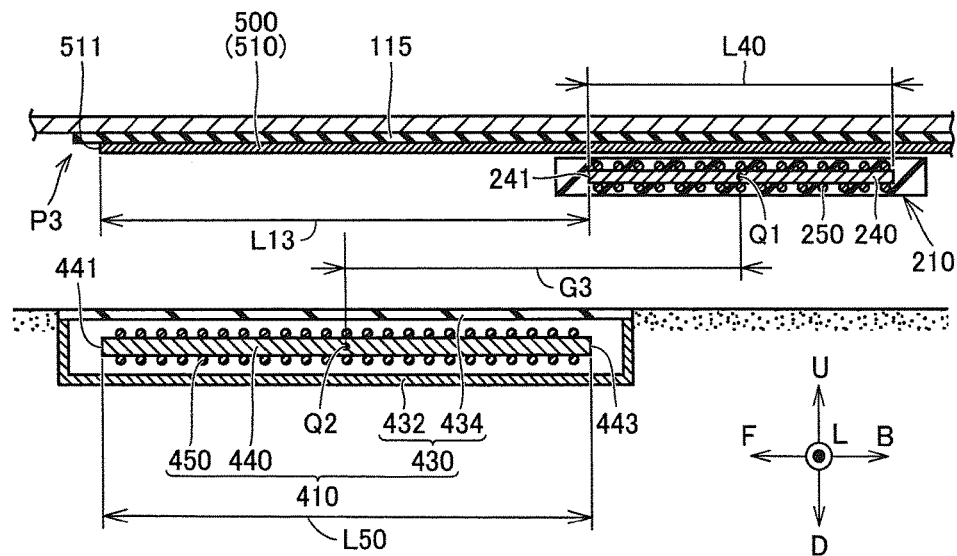
FIG. 10 illustrates functions and effects according to a second variation of the first embodiment.

FIG. 10 shows the state where the vehicle is stopped on the back side (the arrow B side) in the vehicle longitudinal direction with respect to a specified position and when a degree of misalignment G3 in the vehicle longitudinal direction between ferrite core 440 and ferrite core 240 has become as large as the value of length dimension L50 of ferrite core 440 in the vehicle longitudinal direction (degree of misalignment G3 is nearly equal to the value of length dimension L50 of ferrite core 440). Degree of misalignment G3 as used herein is the distance in the vehicle longitudinal direction between a central position Q1 of ferrite core 240 in the vehicle longitudinal direction and a central position Q2 of ferrite core 440 in the vehicle longitudinal direction.

In such a state, power reception unit 210 of the power reception device can hardly receive electric power from power transmission unit 410 of the power transmission device. Vehicle ECU 120 (FIG. 1) as a control unit calculates a parameter relevant to power receiving efficiency of power reception device 200, and in the case where the calculated parameter is smaller than a predetermined threshold, transmits a signal for stopping power transmission from power transmission device 400 to power reception device 200.

For example, let it be assumed that power transmission and reception is stopped when degree of misalignment G3 in the vehicle longitudinal direction between ferrite core 440 and ferrite core 240 is as large as the value of length dimension L50 of ferrite core 440. In such a case, there will be little problem even if the amount of protrusion L13 (FIGS. 7 and 10) to the front side of protruding part R13 (third protruding part) (FIG. 7) of first shielding part 510 in the vehicle longitudinal direction with respect to ferrite core 240 is made smaller than the value of length dimension L50 of ferrite core 440 in the vehicle longitudinal direction.

The reason is because, even if a shield is provided at a portion where this amount of protrusion L13 (FIG. 10) becomes more than or equal to the value of length dimension L50 of ferrite core 440 in the vehicle longitudinal direction (a portion indicated by an arrow P3 in FIG. 10), magnetic flux hardly reaches that portion, or in the case where magnetic flux reaches that portion, power transmission and reception is stopped by vehicle ECU 120 (control unit). Even if the shield (protruding part R13) is provided to reach the portion indicated by arrow P3, that portion has little opportunity to exhibit the original shielding function. Therefore, by configuring such that the amount of protrusion L13 (FIGS. 7 and 10) is made smaller than the value of length dimension L50 of ferrite core 440 in the vehicle longitudinal direction, and such that the shield is not provided at the portion where the shield will have little opportunity to exhibit its shielding function, the manufacturing cost of the shield can be reduced, and at the same time, weight reduction of the vehicle can be achieved.

On the other hand, the above-described amount of protrusion L13 (FIG. 10) is preferably made larger than the value of length dimension L40 of ferrite core 240 in the vehicle longitudinal direction. For example, in the case where degree of misalignment G3 in the vehicle longitudinal direction between ferrite core 440 and ferrite core 240 is smaller than the value of length dimension L40 of ferrite core 240, the power reception device can receive a large amount of electric power from the power transmission device, and power transmission and reception is hardly stopped. Even if degree of misalignment G3 becomes as large as the value of length dimension L40 of ferrite core 240, the shielding function is exhibited by the portion of the shield provided such that the amount of protrusion L13 becomes larger than the value of length dimension L40 of ferrite core 240 in the vehicle longitudinal direction, which can prevent magnetic flux from reaching the floor panel.

Functions and effects similar to those of the configuration described above as the first variation can be applied to the amount of protrusion L23 (FIG. 7) of protruding part R23 (FIG. 7) of second shielding part 520 to the front side in the vehicle longitudinal direction with respect to ferrite core 240. Similarly to the case of the first variation, the configuration for calculating a parameter relevant to power receiving efficiency of power reception device 200 is not limited to the above-described one. As for the parameter relevant to power receiving efficiency of power reception device 200, a parameter obtained on the power transmission side may be transmitted to the power reception side through communication. In this case, power transmission ECU 320 (FIG. 1) is configured to function as a control unit.

(Third Variation)

Figure 11:
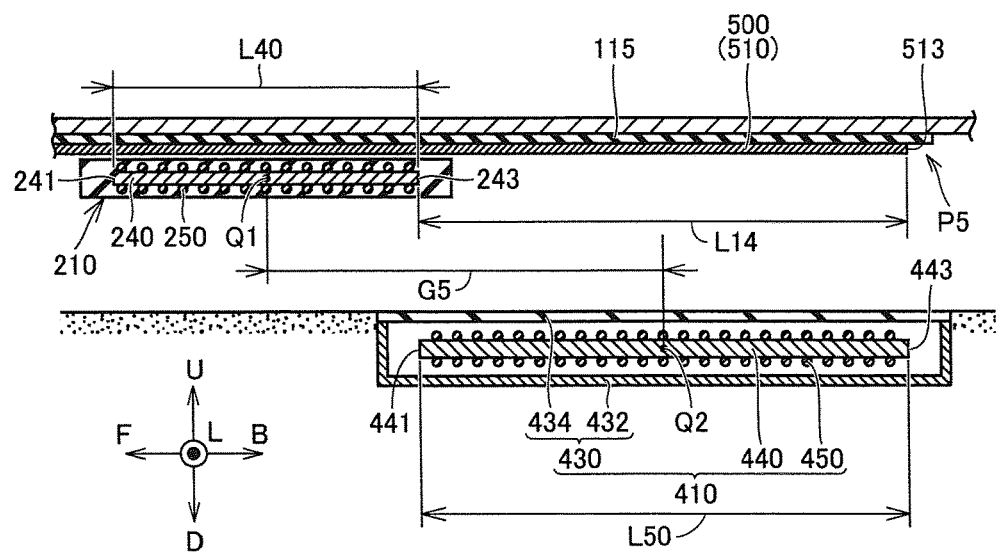
FIG. 11 illustrates functions and effects according to a third variation of the first embodiment.

FIG. 11 shows the state where the vehicle is stopped on the front side (the arrow F side) in the vehicle longitudinal direction with respect to a specified position and when a degree of misalignment G5 in the vehicle longitudinal direction between ferrite core 440 and ferrite core 240 has become as large as the value of length dimension L50 of ferrite core 440 in the vehicle longitudinal direction (degree of misalignment G5 is nearly equal to the value of length dimension L50 of ferrite core 440). Degree of misalignment G5 as used herein is the distance in the vehicle longitudinal direction between central position Q1 of ferrite core 240 in the vehicle longitudinal direction and central position Q2 of ferrite core 440 in the vehicle longitudinal direction.

In such a state, power reception unit 210 of the power reception device can hardly receive electric power from power transmission unit 410 of the power transmission device. Vehicle ECU 120 (FIG. 1) as a control unit calculates a parameter relevant to power receiving efficiency of power reception device 200, and in the case where the calculated parameter is smaller than a predetermined threshold, transmits a signal for stopping power transmission from power transmission device 400 to power reception device 200.

For example, let it be assumed that power transmission and reception is stopped when degree of misalignment G5 in the vehicle longitudinal direction between ferrite core 440 and ferrite core 240 is as large as the value of length dimension L50 of ferrite core 440. In such a case, there will be little problem even if the amount of protrusion L14 (FIGS. 7 and 11) to the back side of protruding part R14 (fourth protruding part) (FIG. 7) of first shielding part 510 in the vehicle longitudinal direction with respect to ferrite core 240 is made smaller than the value of length dimension L50 of ferrite core 440 in the vehicle longitudinal direction.

The reason is because, even if a shield is provided at a portion where this amount of protrusion L14 (FIG. 11) becomes more than or equal to the value of length dimension L50 of ferrite core 440 in the vehicle longitudinal direction (a portion indicated by an arrow P5 in FIG. 11), magnetic flux hardly reaches that portion, or in the case where magnetic flux reaches that portion, power transmission and reception is stopped by vehicle ECU 120 (control unit). Even if the shield (protruding part R14) is provided to reach the portion indicated by arrow P5, that portion has little opportunity to exhibit the original shielding function. Therefore, by configuring such that the amount of protrusion L14 (FIGS. 7 and 11) is made smaller than the value of length dimension L50 of ferrite core 440 in the vehicle longitudinal direction and such that the shield is not provided at the portion where the shield will have little opportunity to exhibit its shielding function, the manufacturing cost of the shield can be reduced, and at the same time, weight reduction of the vehicle can be achieved.

On the other hand, the above-described amount of protrusion L14 (FIG. 11) is preferably made larger than the value of length dimension L40 of ferrite core 240 in the vehicle longitudinal direction. For example, in the case where degree of misalignment G5 in the vehicle longitudinal direction between ferrite core 440 and ferrite core 240 is smaller than the value of length dimension L40 of ferrite core 240, the power reception device can receive a large amount of electric power from the power transmission device, and power transmission and reception is hardly stopped. Even if degree of misalignment G5 becomes as large as the value of length dimension L40 of ferrite core 240, the shielding function is exhibited by the portion of the shield provided such that the amount of protrusion L14 becomes larger than the value of length dimension L40 of ferrite core 240 in the vehicle longitudinal direction, which can prevent magnetic flux from reaching the floor panel.

Functions and effects similar to those of the configuration described above as the third variation can be applied to the amount of protrusion L24 (FIG. 7) of protruding part R24 (FIG. 7) of second shielding part 520 to the back side in the vehicle longitudinal direction with respect to ferrite core 240. Similarly to the case of the first variation, the configuration for calculating a parameter relevant to power receiving efficiency of power reception device 200 is not limited to the above-described one. As for the parameter relevant to power receiving efficiency of power reception device 200, a parameter obtained on the power transmission side may be transmitted to the power reception side through communication. In this case, power transmission ECU 320 (FIG. 1) is configured to function as a control unit.

Second Embodiment

Figure 12:
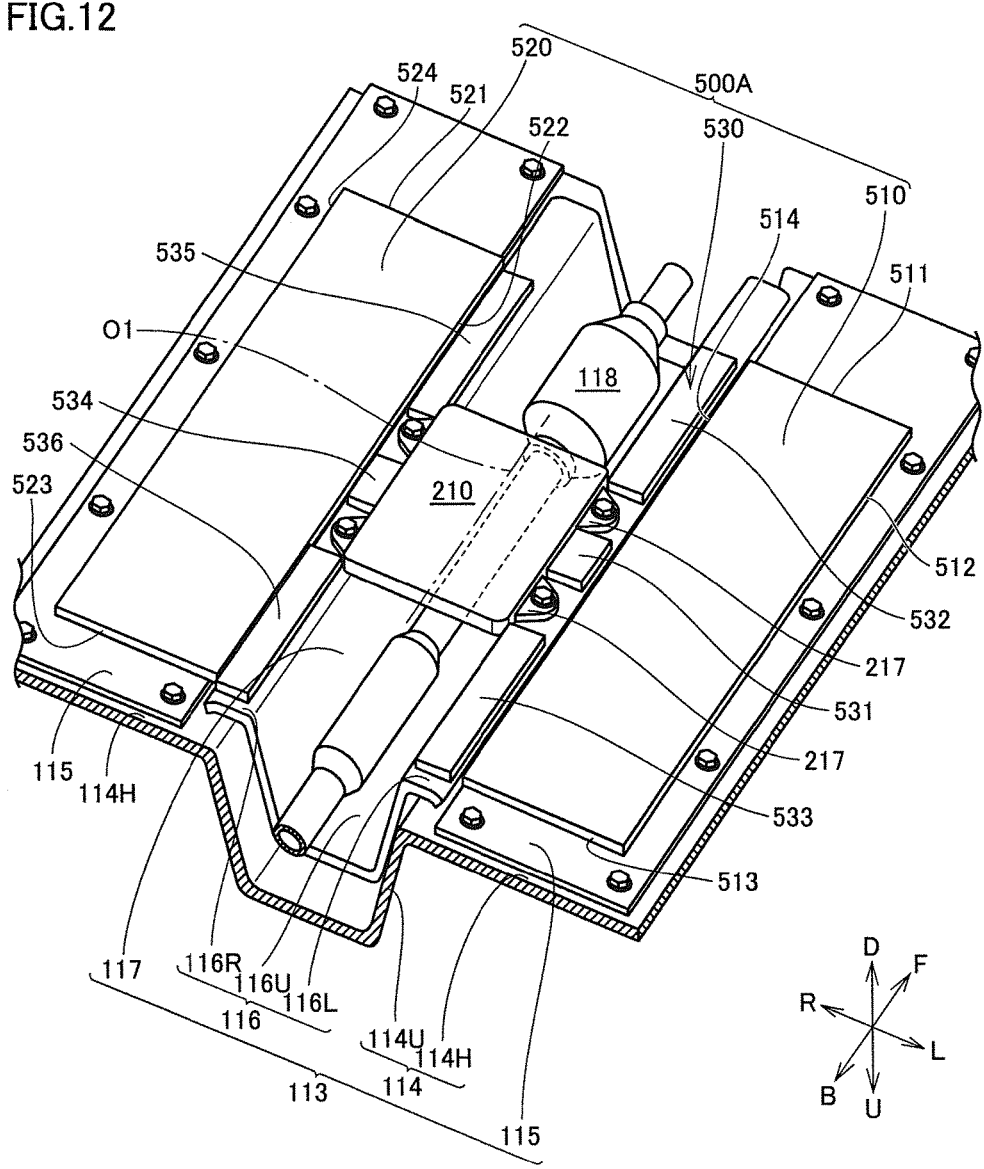
FIG. 12 is a perspective view showing part of the bottom structure (such as a power reception unit and a shield) of a vehicle according to a second embodiment.

A shield 500A shown in FIG. 12 further includes shielding pieces 531 to 536. Shielding pieces 531 to 533 are attached to flange 116L of reinforcement 116. Shielding pieces 534 to 536 are attached to flange 116R of reinforcement 116. Shielding pieces 531 and 534 are each disposed between a pair of flanges 217 and 217 provided on the side part of power reception unit 210. Shielding pieces 532 and 535 are positioned on the front side in the vehicle longitudinal direction with respect to pair of flanges 217 and 217, and shielding pieces 533 and 536 are positioned on the back side in the vehicle longitudinal direction with respect to pair of flanges 217 and 217. By providing shielding pieces 531 to 536, a portion of floor panel 113 positioned around ferrite core 240 is covered more closely. Therefore, heat generation of floor panel 113 resulting from leakage flux can further be prevented.

Third Embodiment

Figure 13:
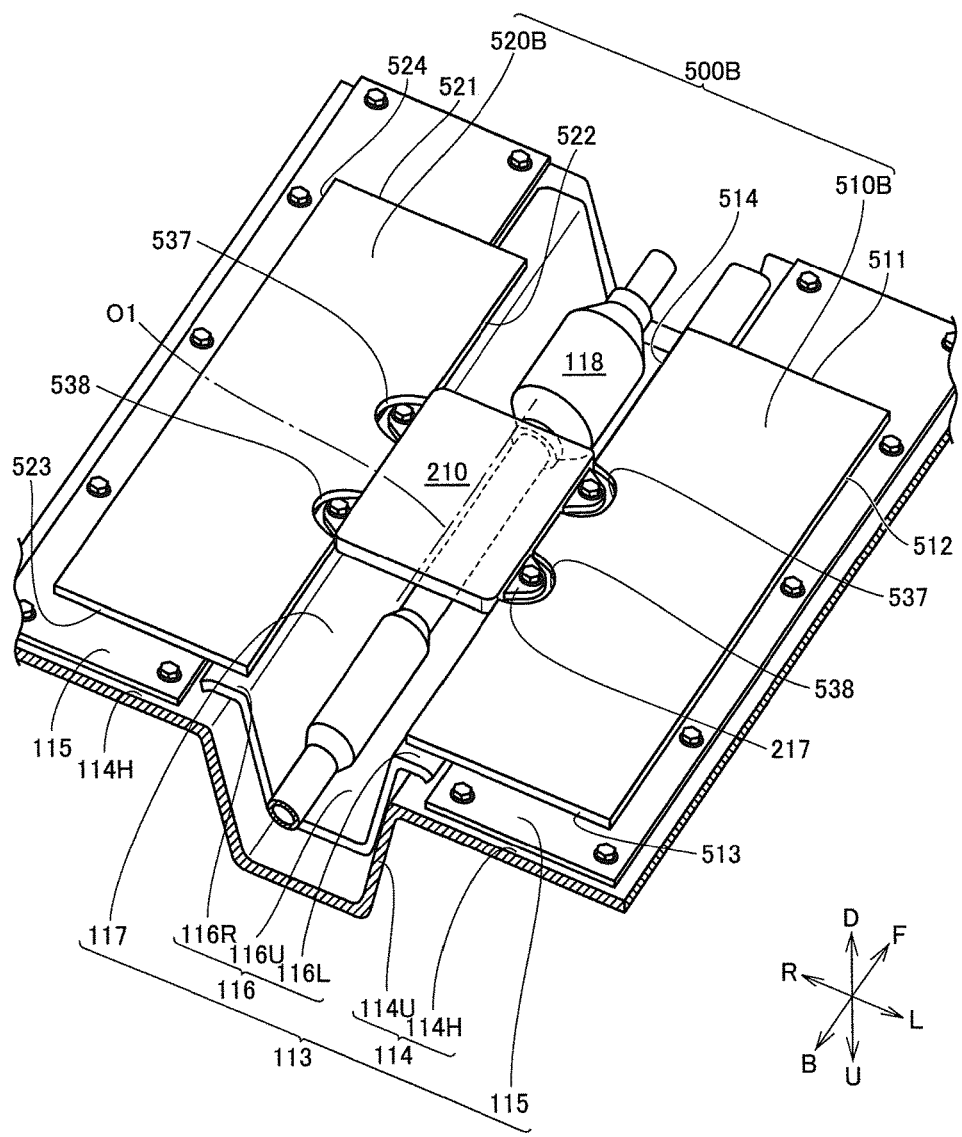
FIG. 13 is a perspective view showing part of the bottom structure (such as a power reception unit and a shield) of a vehicle according to a third embodiment.

A shield 500B shown in FIG. 13 includes a first shielding part 510B and a second shielding part 520B. First shielding part 510B and second shielding part 520B each have notches 537 and 538, each corresponding to the shape of flange 217. The shape of first shielding part 510B corresponds to first shielding part 510 and shielding pieces 531 to 533 according to the second embodiment (FIG. 12) integrated as a unit. The shape of second shielding part 520B corresponds to second shielding part 520 and shielding pieces 534 to 536 according to the above-described second embodiment (FIG. 12) integrated as a unit. By covering the portion of floor panel 113 positioned around ferrite core 240 more closely, heat generation of floor panel 113 resulting from leakage flux can further be prevented. Because of integration, it becomes convenient for the attachment operation. The position of notches 537, 538 and the position of outer edges 514, 522 may be brought close to power reception unit 210 as much as possible to configure such that heat generation of floor panel 113 resulting from leakage flux can further be prevented.

Fourth Embodiment

Figure 14:
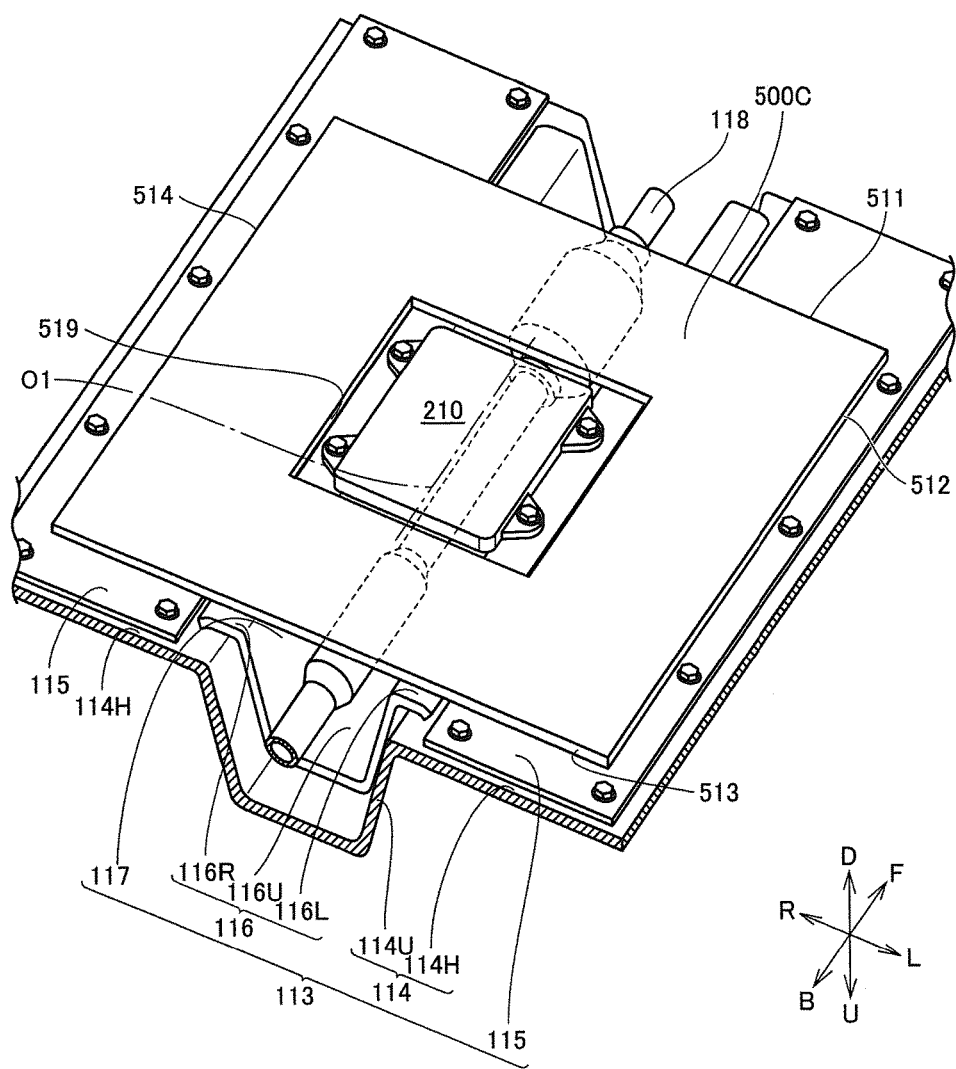
FIG. 14 is a perspective view showing part of the bottom structure (such as a power reception unit and a shield) of a vehicle according to a fourth embodiment.

Shield 500C shown in FIG. 14 includes a bored part 519, and is formed from a piece of flat plate having an annular shape as a whole. The bored part 519 is located to surround power reception unit 210. With this configuration, the portion of floor panel 113 positioned around ferrite core 240 is also covered more closely. Heat generation of floor panel 113 resulting from leakage flux can further be prevented. Comparing shield 500C with shields 500, 500A and 500B according to the above-described first to third embodiments, the above-described first to third embodiments can be said to be advantageous in terms of air permeability since central tunnel 117 is not covered with a shield.

Fifth Embodiment

Figure 15:
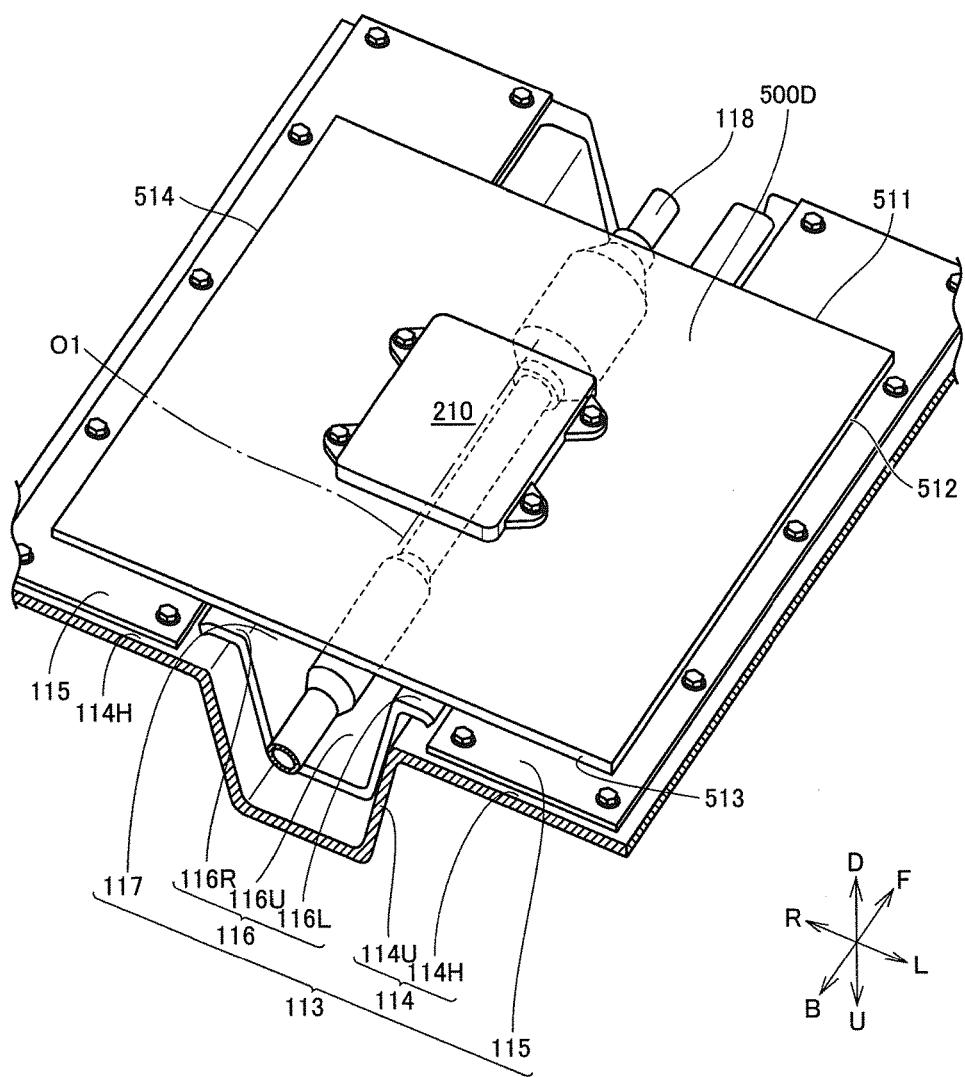
FIG. 15 is a perspective view showing part of the bottom structure (such as a power reception unit and a shield) of a vehicle according to a fifth embodiment.

Shield 500D shown in FIG. 15 is formed from a piece of flat plate. Power reception unit 210 is attached to floor panel 113 with shield 500D interposed therebetween. With this configuration, the portion of floor panel 113 positioned around ferrite core 240 is also covered more closely. Heat generation of floor panel 113 resulting from leakage flux can further be prevented. Comparing shield 500D with shields 500, 500A and 500B according to the above-described first to third embodiments, the above-described first to third embodiments can be said to be advantageous in terms of air permeability since central tunnel 117 is not covered with a shield.

Although the embodiments have been described above based on the present invention, the above disclosure is illustrative and non-restrictive in every respect. The technical scope of the present invention is defined by the claims, and is intended to include any modification within the meaning and scope equivalent to the terms of the claims.

REFERENCE SIGNS LIST 100 vehicle; 110 vehicle main body; 111 wheel; 112 bottom; 113 floor panel; 114 panel main body; 114H flat plate portion; 114U, 116U recess; 115 cover; 116 reinforcement; 116L, 116R, 217 flange; 117 central tunnel; 118 exhaust pipe; 120 vehicle ECU; 130 rectifier; 140 converter; 150 battery; 160 power control unit; 170 motor unit; 180, 322 communication unit; 200 power reception device; 210 power reception unit; 218 bolt; 220, 420 capacitor; 230 resin member, 240, 440 ferrite core; 241, 242, 243, 244 side surface; 245 upper surface; 246, 515, 525 lower surface; 250 power reception coil; 300 external power feeding apparatus; 310 high frequency power device; 320 power transmission ECU; 330 AC power supply; 400 power transmission device; 410 power transmission unit; 430 case member; 432 storage unit; 434 lid; 450 power transmission coil; 500, 500A, 500B, 500C, 500D shield; 510, 510B first shielding part; 511, 512, 513, 514, 521, 522, 523, 524 outer edge; 519 bored part; 520, 520B second shielding part; 531, 532, 533, 534, 535, 536 shielding piece; 537, 538 notch; 1000 contactless power transfer system; E1, E2, E3, E4 corner; L13, L14, L23, L24, W11, W21 amount of protrusion; L40 length dimension; O1, O2 coil winding axis; R10, R13, R14, R20, R23, R24 protruding part; W40, W50 width dimension; W60 distance.

The invention claimed is:

1. A contactless power transfer system comprising:
a vehicle comprising:
   a floor panel;
   a power reception device including a secondary side core and a power reception coil wound around said secondary side core, and being attached to a lower surface of said floor panel to receive electric power from a power transmission device in a contactless manner while being opposed to said power transmission device; and
   a shield provided to cover at least a portion of said floor panel positioned around said secondary side core,
   said power reception device including a resin member sealing therein said secondary side core and said power reception coil,
   said power reception coil being embedded within said resin member,
   a flange being provided around said resin member, and said power reception device being attached to said lower surface of said floor panel via said flange; and
a power transmission device including a primary side core and a power transmission coil wound around said primary side core,
one of said vehicle and said power transmission device further including a control unit configured to calculate a parameter relevant to power receiving efficiency of said power reception device,
in the vehicle width direction, a width dimension of said primary side core being larger than the width dimension of said secondary side core,
said shield including a first protruding part protruding to the left side in the vehicle width direction with respect to said secondary side core and a second protruding part protruding to the right side in the vehicle width direction with respect to said secondary side core,
an amount of protrusion of said first protruding part to the left side in the vehicle width direction with respect to said secondary side core and an amount of protrusion of said second protruding part to the right side in the vehicle width direction with respect to said secondary side core each being larger than the width dimension of said secondary side core in the vehicle width direction and smaller than the width dimension of said primary side core,
when said parameter as calculated is smaller than a predetermined threshold, said control unit stopping power transmission from said power transmission device to said power reception device.

2. A contactless power transfer system comprising:
a vehicle comprising:
   a floor panel;
   a power reception device including a secondary side core and a power reception coil wound around said secondary side core, and being attached to a lower surface of said floor panel to receive electric power from a power transmission device in a contactless manner while being opposed to said power transmission device; and
   a shield provided to cover at least a portion of said floor panel positioned around said secondary side core,
   said power reception device including a resin member sealing therein said secondary side core and said power reception coil,
   said power reception coil being embedded within said resin member,
   a flange being provided around said resin member, and said power reception device being attached to said lower surface of said floor panel via said flange; and
a power transmission device including a primary side core and a power transmission coil wound around said primary side core,
one of said vehicle and said power transmission device further including a control unit configured to calculate a parameter relevant to power receiving efficiency of said power reception device,
in the vehicle width direction, a width dimension of said primary side core being larger than the width dimension of said secondary side core,
said shield including a third protruding part protruding to the front side in the vehicle longitudinal direction with respect to said secondary side core and a fourth protruding part protruding to the back side in the vehicle longitudinal direction with respect to said secondary side core,
an amount of protrusion of said third protruding part to the front side in the vehicle longitudinal direction with respect to said secondary side core and an amount of protrusion of said fourth protruding part to the back side in the vehicle longitudinal direction with respect to said secondary side core each being larger than a length dimension of said secondary side core in the vehicle longitudinal direction and smaller than the length dimension of said primary side core,
when said parameter as calculated is smaller than a predetermined threshold, said control unit stopping power transmission from said power transmission device to said power reception device.

3. A contactless power transfer system comprising a vehicle and a power transmission device, said vehicle including a floor panel, a power reception device including a secondary side core and a power reception coil wound around said secondary side core, and being attached to a lower surface of said floor panel to receive electric power from said power transmission device in a contactless manner while being opposed to said power transmission device, and a shield provided to cover a portion of said floor panel positioned around said secondary side core, said power transmission device including a primary side core and a power transmission coil wound around said primary side core, in a vehicle width direction, a width dimension of said primary side core being larger than the width dimension of said secondary side core, in the vehicle width direction, the distance between a portion of said shield positioned on the leftmost side in the vehicle width direction and a portion of said shield positioned on the rightmost side in the vehicle width direction being larger than the width dimension of said primary side core, said power reception device including a resin member sealing therein said secondary side core and said power reception coil, said power reception coil being embedded within said resin member;

a flange being provided around said resin member, and said power reception device being attached to said lower surface of said floor panel via said flange.

4. The contactless power transfer system according to claim 3, wherein said shield is provided with a notch having a shape corresponding to said flange, and said flange is located inside the notch.

* * * * *